(12) United States Patent
Ervin et al.

(10) Patent No.: US 7,415,950 B2
(45) Date of Patent: Aug. 26, 2008

(54) ENGINE VALVE CONTROL SYSTEM AND METHOD

(75) Inventors: James Ervin, Novi, MI (US); Yan Wang, Ann Arbor, MI (US); Thomas Megll, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/627,316

(22) Filed: Jan. 25, 2007

(65) Prior Publication Data

US 2008/0178827 A1 Jul. 31, 2008

(51) Int. Cl.
*F01L 9/04* (2006.01)

(52) U.S. Cl. .............. 123/90.11; 251/129.01; 251/129.16

(58) Field of Classification Search ............. 123/90.11; 251/129.01, 129.15, 129.16
See application file for complete search history.

(56) References Cited

U.S. PATENT DOCUMENTS

| | | | |
|---|---|---|---|
| 5,991,143 A | 11/1999 | Wright et al. | |
| 6,044,814 A | 4/2000 | Fuwa | |
| 6,427,651 B1 | 8/2002 | Kemper et al. | |
| 6,684,854 B2 * | 2/2004 | Coldren et al. | 123/446 |
| 6,772,737 B2 | 8/2004 | Gaessler et al. | |
| 7,270,093 B2 * | 9/2007 | Luercho | 123/90.11 |

* cited by examiner

*Primary Examiner*—Ching Chang
(74) *Attorney, Agent, or Firm*—Allan J. Lippa; Alleman Hall McCoy Russell & Tuttle, LLP

(57) ABSTRACT

A method of operating an engine having at least one cylinder, said cylinder including at least one electric valve actuator, said actuator including at least a coil and an armature moveable thereto, the method comprising during a non-firing state of the cylinder: holding the armature of the actuator at a first position away from an equilibrium position by supplying a first amount of current to a first coil of the actuator; and reducing current supplied to the first coil from said first amount to a lower second amount to cause the armature to begin moving toward the equilibrium position; and during a subsequent firing state of the cylinder, varying an amount of holding current supplied to the first coil for holding the armature away from the equilibrium position based on at least said second amount of current.

14 Claims, 7 Drawing Sheets

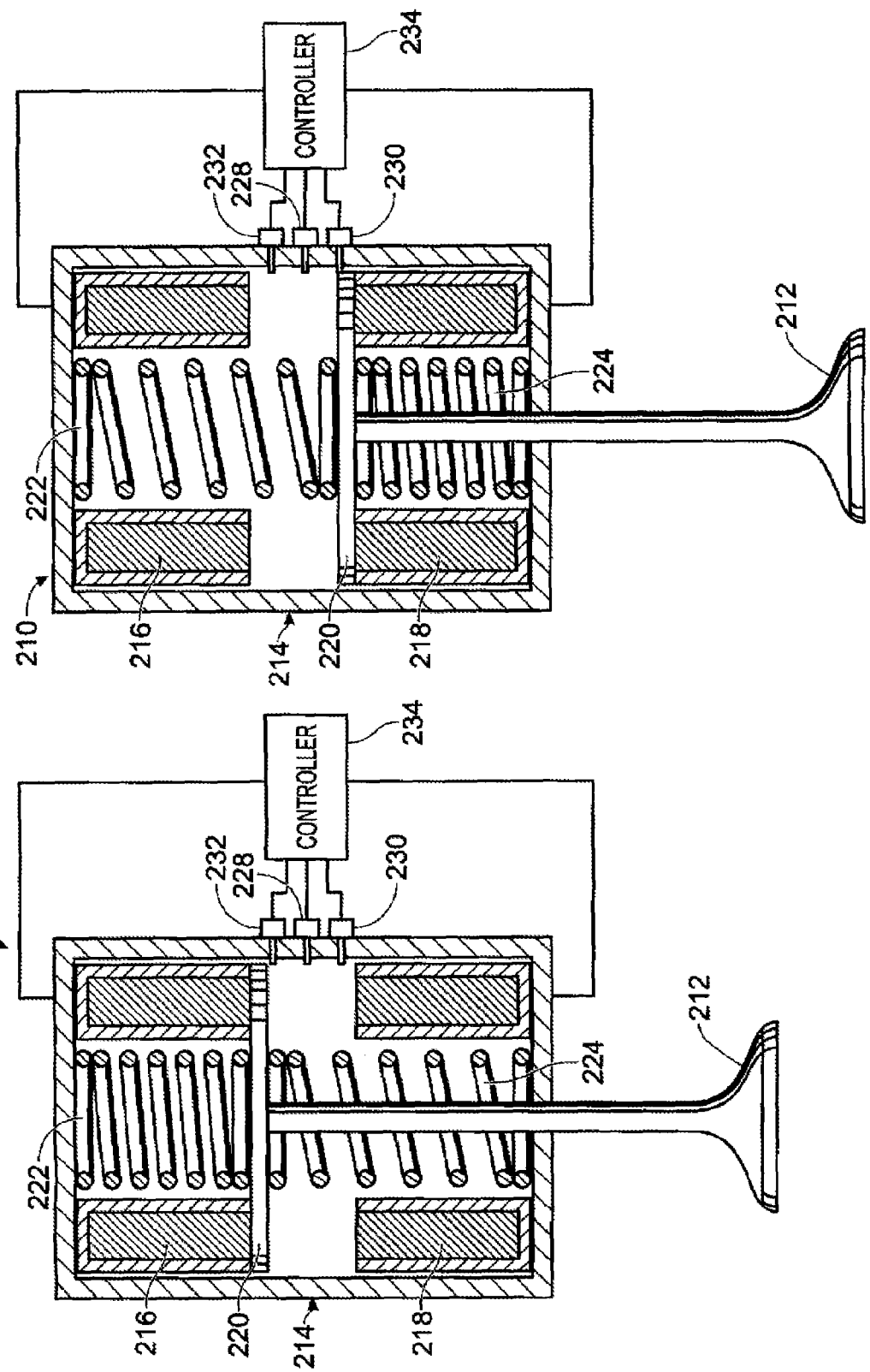

ENGINE VALVE CONTROL SYSTEM AND METHOD

BACKGROUND AND SUMMARY

Some internal combustion engines are equipped with electric valve actuators that can be operated to vary the position of an intake or exhaust valve of an engine cylinder. Some electric valve actuators may include a spring that biases the valve at a particular equilibrium position. In order to move the valve relative to the equilibrium position, a current may be supplied to a magnetic coil of the actuator. In some conditions, a minimum or base level of current may be applied to the actuator to hold the valve in a particular position away from the equilibrium position. However, identifying the base level of current for a valve may be difficult due to variations in valve construction and/or changing operating conditions of the valve. Likewise, individually testing each actuator before installation may be impractical or costly.

In one approach, a common level of current for some or all of the electric valves of a set may be identified by determining the highest base current or upper limit of the tolerance of all of the electric valve actuators of the set. The common level of current may then include at least the highest base holding current of the set and may include an additional amount of current to provide robust operation.

However, the inventors herein have recognized that some issues may exist with the above approach. Specifically, a common holding current delivered to two or more valve actuators may result in a higher level of current than is necessary for some of the actuators to maintain a particular holding position. This additional current supplied to the actuators may serve to increase the power consumed by the electric valve actuation system, during some engine conditions. Further, differences between the base level of current for holding the valve actuator and the assigned common level of current may cause variations from actuator to actuator in the time delay between a valve command and physical movement of the valves. These variations in response time may, in at least some cases, degrade engine performance or efficiency.

In a first approach, as described herein, the above issues may be addressed by A method of operating an engine having at least one cylinder, said cylinder including at least one electric valve actuator, said actuator including at least a coil and an armature moveable thereto, the method comprising: during a non-firing state of the cylinder:

holding the armature of the actuator at a first position away from an equilibrium position by supplying a first amount of current to a first coil of the actuator; and reducing current supplied to the first coil from said first amount to a lower second amount to cause the armature to begin moving toward the equilibrium position; and during a subsequent firing state of the cylinder, varying an amount of holding current supplied to the first coil for holding the armature away from the equilibrium position based on at least said second amount of current.

In this way, a valve actuator may be operated at or near its particular base holding current in response to a condition of the particular actuator that is identified before combustion is initiated in the engine or cylinder thereof. Thus, degradation of engine performance and/or efficiency may be reduced.

Note, that this approach may be applied independently to each coil of the actuator to identify a different holding current for the open position and closed position of the valve. Further, the above approach may be applied over successive cylinder shut-downs while other cylinders are operating such as with a variable displacement engine or during an engine shut-down such with a hybrid electric vehicle (HEV) utilizing period engine shut-off to conserve energy. In this manner, the holding current of the valve actuator may be updated as operating conditions of the actuator change with time, due to temperature, aging, etc.

Further still, the above approach may be used together or independently with other approaches described herein to further reduce power consumption of the electric valve actuation system and/or to reduce delay variance between valves. Still other approaches described herein may be used to provide a sufficient holding current while reducing delay variations among valves and increasing efficiency of the valve actuation system.

DESCRIPTION OF THE DRAWINGS

FIGS. 2A and 2B are schematic diagrams of an example electric valve actuation system in a first position and a second position.

DETAILED DESCRIPTION

Figure 1:
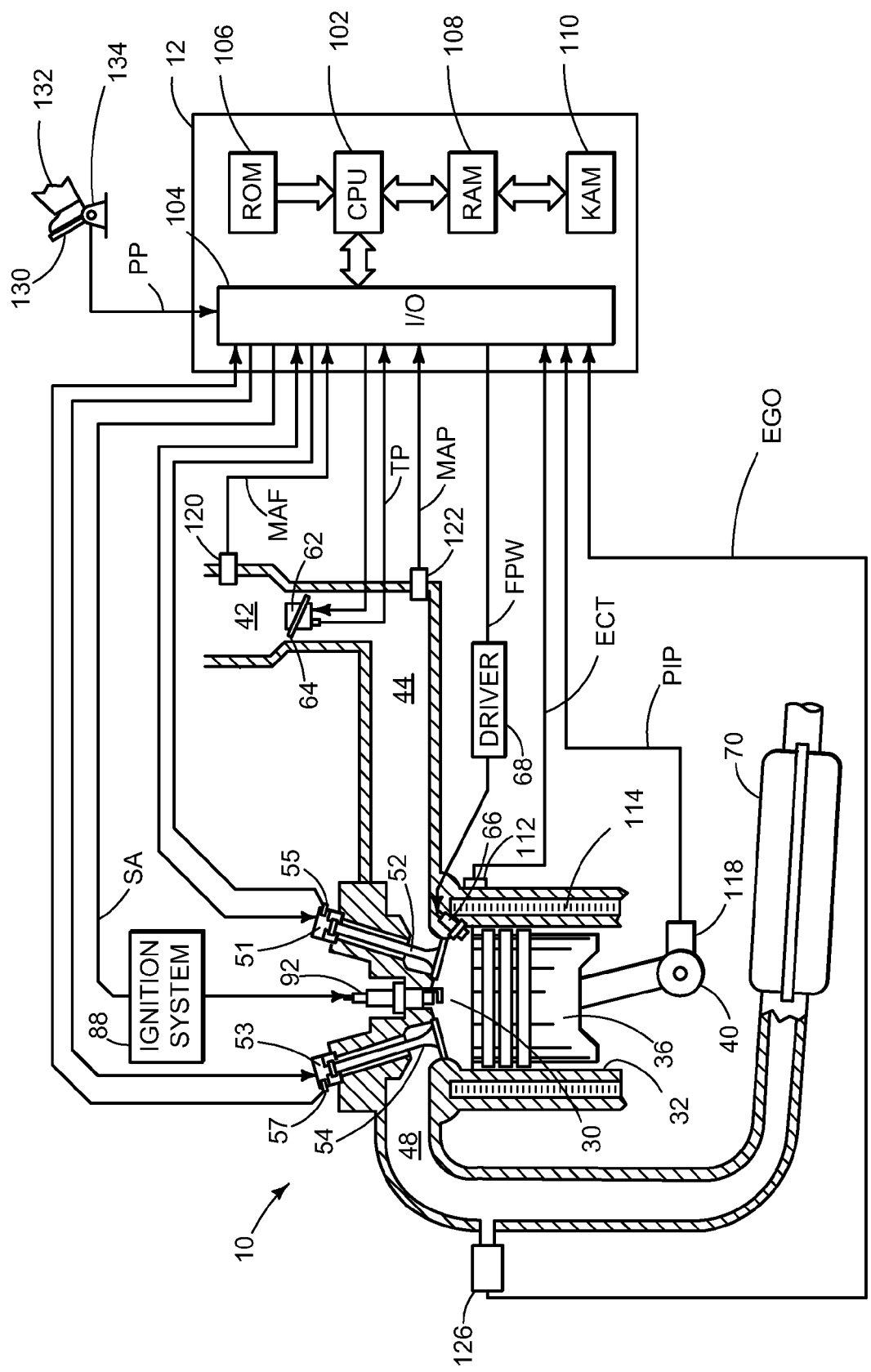
FIG. 1 is a schematic diagram of a portion of an example internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including the measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows only one cylinder of a multi-cylinder engine, and that each cylinder may similarly include its own set of intake valves and corresponding electric valve actuators, exhaust valves and corresponding electric valve actuators, fuel injector, spark plug, etc.

Figure 2C:
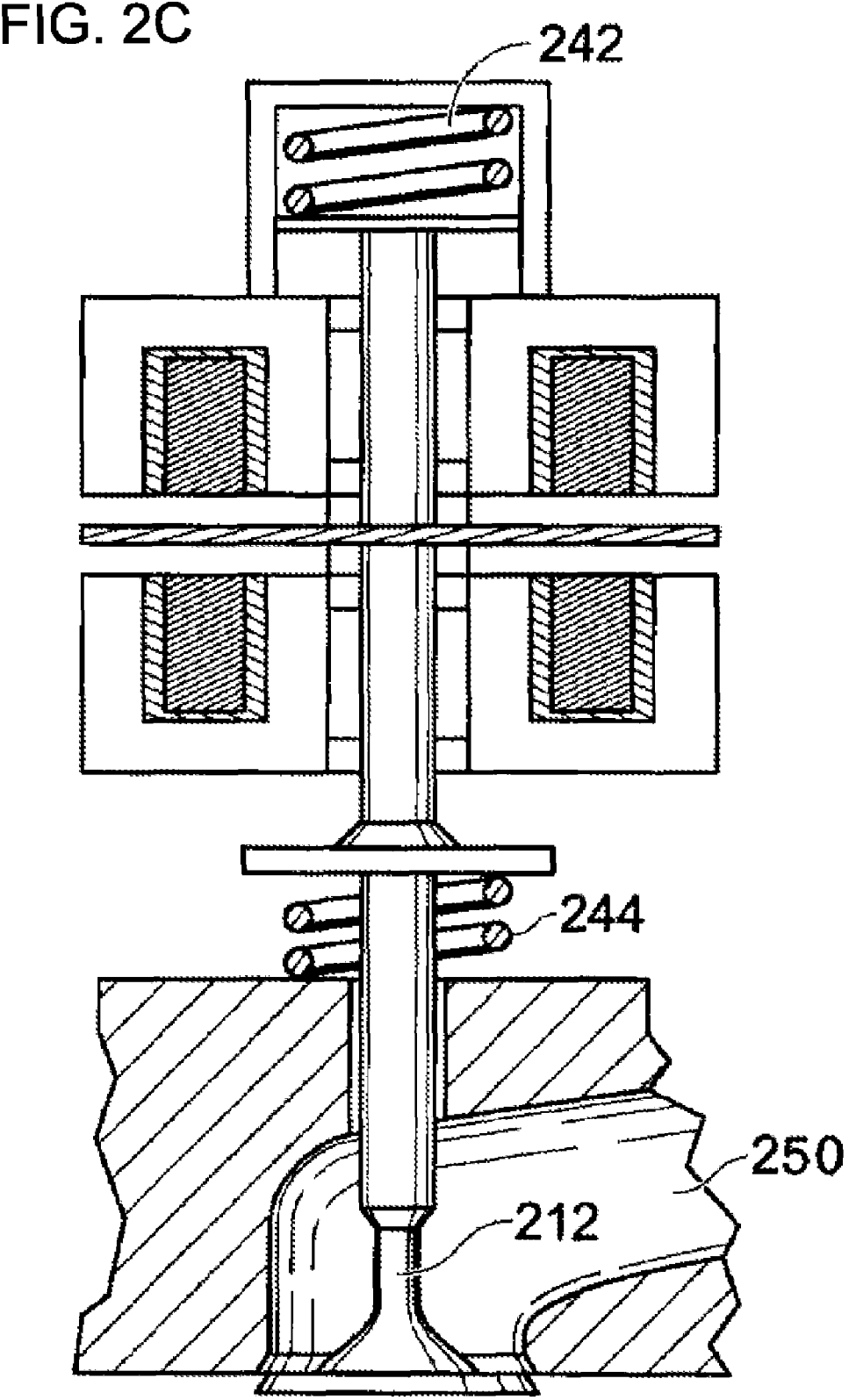
FIG. 2C is a schematic diagram of another of an example electric valve actuation system.

FIGS. 2A, 2B, and 2C show a detailed view of an EVA system and valve that may be used as one of the intake or exhaust valves described above with reference to FIG. 1. Referring to FIGS. 2A and 2B, an EVA system 210 is shown for controlling movement of a valve 212 of a cylinder between a fully closed position (shown in FIG. 2A), and a fully open position (shown in FIG. 2B). The apparatus 210 includes an electric valve actuator (EVA) 214 with upper and lower coils 216 and 218 which electromagnetically drive an armature 220 against the force of upper and lower springs 222 and 224 for controlling movement of the valve 212.

One or more sensors 228, 230, and 232 may be provided for detecting a position, velocity and/or acceleration of armature 220. As one embodiment, at least one of sensors 228, 230, and 232 may include a switch type sensor that detects when armature 220 passes within a region of the sensor. In some embodiments, at least one of sensors 228, 230, and 232 may provide continuous position, velocity, and/or acceleration data to the control system for the armature and/or valve position.

Controller 234, which can be combined into controller 12, or can act as a separate controller portion of the control system is shown operatively connected to position sensors 228, 230, and 232, and to the upper and lower coils 216 and 218 to control actuation and landing of valve 212. As described above, engine 10 has one or more electric valve actuators that may be used to vary the lift height, lift duration, and/or opening and closing timing in response to operating conditions of the engine.

FIG. 2C shows an alternative embodiment of an EVA system including a dual coil oscillating mass actuator with an engine valve actuated by a pair of opposing electromagnetic coils (e.g. solenoids), which are designed to overcome the force of a pair of opposing valve springs 242 and 244 arranged differently than the actuator of FIGS. 2A and 2B. Other components of the electric valve actuation system of FIG. 2C may be similar to those of FIGS. 2A and 2B, except that FIG. 2C shows port 250, which can be an intake or exhaust port of a cylinder of the engine. Applying a variable voltage to the coil of the electromagnet induces current to flow, which controls the force produced by each electromagnet. With some EVA systems, each electromagnet that makes up an actuator may be only able to produce a force in one direction, independent of the polarity of the current in its coil.

As illustrated above, the electrically actuated valves in the engine may remain in a half open position when the actuators are de-energized (e.g. no current is supplied). Therefore, prior to a combustion operation of the cylinder, each valve may go through an initialization cycle. During an initialization cycle, the actuators can be pulsed with current, in a prescribed manner, in order to establish the valves in the fully closed or fully open position. Further, as will be described below in greater detail, the initialization cycle may include a determination of a base level of holding current for one or more magnetic coils of the EVA system. Following this initialization, the valves can be sequentially actuated according to the desired valve timing and firing order by the pair of electromagnetic coils, a first electromagnetic coil (e.g. the lower coil) for pulling the valve open and a second electromagnetic coil (e.g. the upper coil) for pulling the valve closed.

The magnetic properties of each electromagnet may be such that only a single electromagnetic coil (upper or lower) need be energized at any time. Since one of the coils (e.g. the upper coil) holds the valve closed for the majority of each engine cycle, it may be operated for a much higher percentage of time than that of the other coils (e.g. the lower coil).

In one example, during power-up in an EVA engine, all (or a portion) of the electrically actuated valves can be held in the half open position by a pair of valve springs, as shown by FIG. 2C. When compressed, these springs can have sufficient force to act on the valve in such a way as to force it to traverse the air gap into the open or closed position. Once the valve has been transitioned into either the open or closed position, the coils may be energized where they catch the armature and hold the valve in that position. Once the valve is caught and held, the power required to maintain that position may be reduced to a target level of current, which is at or greater than a base level of holding current for the particular electromagnetic coil of the EVA system.

Initially an electromagnetic coil can bring the valve from a center (rest) position to either the fully open or fully closed positions. This may be accomplished for each pair of electromagnetic coils of each valve, e.g., up to thirty-two valves in a 4 EVA per cylinder 8-cylinder engine, to move the valves into positions that allow a start-up of the engine or start-up of an individual cylinder of the engine.

Referring now to FIGS. 3-7, several approaches are described for identifying a base holding current for each coil of each valve, which may be used to enable one or more electric valve actuators of an engine to be operated at a coil specific target holding current near its respective base holding current. In some conditions, the ability to independently manage holding current may reduce the amount of power consumed by the electric valve actuators and/or may improve repeatability of actuator release by creating a more similar valve response. Further, in some conditions, variations between two or more valve actuators such as between the center position, lash, spring stiffness, spring preload adjustment, and magnetic circuit, or other conditions may result in variations in the base holding current for each actuator. In some cases, the base current for holding each armature at each pole may vary significantly from one actuator to the next.

As one prophetic example, measurements of an engine equipped with electric valve actuators has shown that the base holding current of the actuator can vary within a range of 2A to 4A. One strategy that may be used to account for this variance includes setting the holding current of some or all of the electric valve actuators to a common value, which may include a margin (e.g. 20%) that is higher than the highest base holding current of any actuator in the set. While this approach may enable robust holding of each armature of the engine, it may nonetheless provide a higher margin of holding current than is necessary for some of the actuators to maintain holding of the armature.

The application of a higher holding current may have various consequences. As one example, a greater power consumption may result during engine operation, thereby reducing efficiency of the vehicle. When each of the armatures are held with the same or similar higher holding current, some of the electric valve actuators may consume more power than they would if they were held with a lower current that was tailored specifically for the particular actuator and conditions.

As another prophetic example, up to 75% more power may be consumed when holding an armature at the same current than what would be consumed if a separate reduced current were instead used for one or more coils of the actuator. This approach may provide greater increases in fuel economy where the engine is operating at lower speeds since the energy consumed by the actuators may include a substantial portion of the total energy consumption of the engine at lower speeds. For example, at engine idle, up to 50% of the power produced by the engine may be consumed by the electric valve actuators for holding the valves in a particular position. As another example, a constant holding current may consume up to 400 W at the crankshaft, where use of a minimum or reduced holding current strategy may consume less power, such as 230W. Thus, greater efficiency may be achieved by adjusting a holding current differently for at least 2 coils or actuators.

In one example, an electric valve actuator may be operated at or near its base holding current by identifying a base holding current for each coil of the actuator. Once the base holding current for each coil is identified, a suitable margin may be added to the base holding current to arrive at a target holding current that may be applied by the control system during operation of the engine. As will be described below with reference to FIGS. 3-7, the base holding current may be identified using several different approaches depending on the operating state of the engine. While these approaches may be described independent of each other, it should be appreciated that they may both be used or may be used exclusive of each other depending on the operating state of the engine or the particular control strategy employed. Further, other alternative approaches may also be used.

Figure 3:
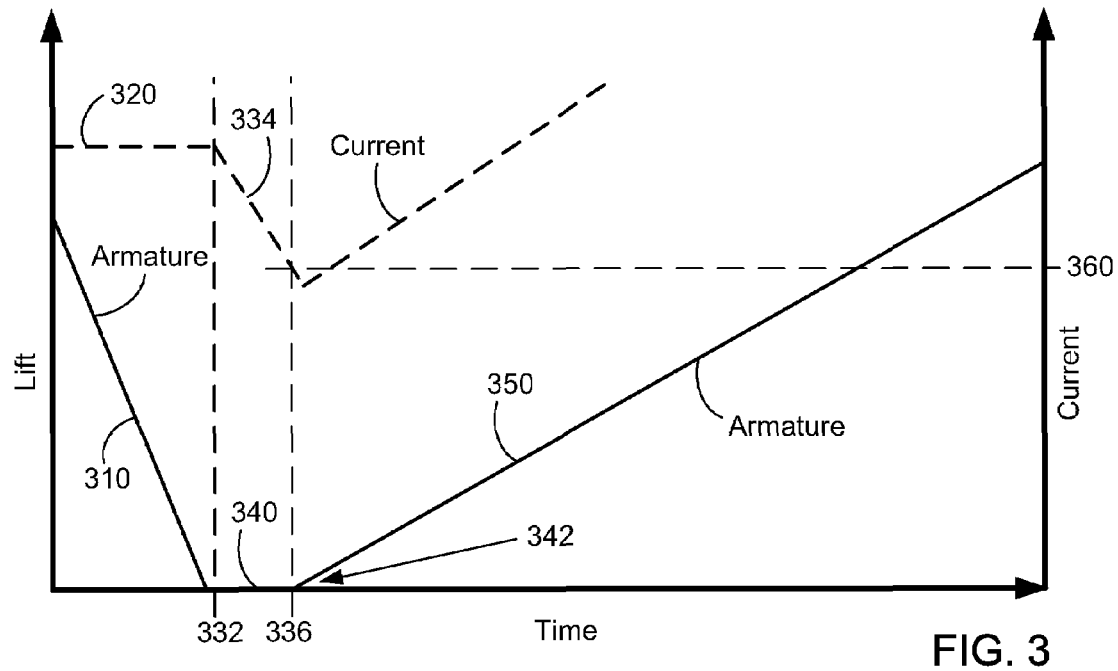
FIG. 3 is a graph illustrating an initialization operation for a valve actuator for identifying a base holding current.

As a first approach, illustrated in FIG. 3, a base holding current for an electric valve actuator may be identified during a non-firing operating state of the cylinder. A non-firing operating state of the cylinder may include the time period before and/or during engine start-up or during a reactivation of a deactivated cylinder of the engine (e.g. where a variable displacement engine (VDE) is considered). As such, a base holding current can be separately identified for each of the electromagnetic coils of a particular electric valve actuator, as well as the other electric valve actuators of the engine at least during a non-firing condition of the cylinder.

Referring now to FIG. 3, the position or lift of the armature is compared to the level of current applied to an electromagnetic coil of the valve actuator during an operation where the base holding current is identified for each of the electromagnetic coils. The armature is pulled toward the coil at 310 by a current 320. As the armature reaches the coil at 340, the current may be reduced over time beginning at 332 as indicated by 334 by the control system. At a time of 336 and current of 360, the armature begins to move from the coil as indicated by 342. The time 336 and/or current 360 may be stored by the control system, wherein the current 360 at which the armature moves relative to the coil corresponds to the base holding current. Alternatively, the base holding current may be inferred from the time (336) at which the armature begins moving based on the profile of the controlled current reduction at 334. Such an operation may be employed during a non-firing condition of the cylinder, for example, to enable a greater period where measurement of the base holding current may be performed without adversely effecting operation of the cylinder, thereby enabling a more accurate measurement of the base holding current, at least under some conditions.

In this way, by reducing the current supplied to the particular coil from an initial level of current larger than the base holding current until motion of the armature or valve is detected, the base holding current may be identified. The level of current supplied to the coil when motion of the armature or valve is detected may be stored in memory as the base holding current for the particular coil. As described above with reference to FIGS. 1 and 2, a position, velocity, and/or acceleration of a particular armature or valve can be detected by a valve sensor (e.g. one or more of sensors 55, 57, 228, 230, and 232). In some embodiments, this approach may be accomplished during a key-on sequence before cranking of the engine (e.g. during valve initialization), during engine start-up (e.g. cranking), or before or during reactivation of deactivated valves of a VDE.

As one non-limiting example of the above approach, a valve may be pulled toward a corresponding first coil (e.g. the lower electromagnet) of the electric valve actuator, where it is held in a fixed position while current supplied to the first coil is ramped down over a period of time of approximately 5 ms or other suitable time period (e.g. the time between 332 and 336) and a base holding current may be identified based on the timing of the release of the first valve. Next, the first valve may be caught at a second coil (e.g. the upper electromagnet) of the actuator, where over a similar time span (e.g. 5 ms), the current supplied to the second coil may be ramped down and a base holding current may be identified for the second coil through the timing of release of the valve. Next, the valve may be again caught at the first coil where the valve may be ready for operation. While the above example describes a 5 ms period of time where current is varied to identify the base holding current, it should be appreciated that the current may be varied over other time periods either longer or shorter in duration than the above example.

With some electric valve actuators, the valve timing when a valve is opened or closed may be defined by a timing where the valve reaches a certain threshold position. For example, the valve may be considered to be in an opened position at a valve lift of at least 0.7 mm. However, it should be appreciated that the level of valve lift may be different with different actuators, engines, or control systems. Further, in some examples, accurate valve timing may be a substantial factor in controlling the actual air charge delivered to the cylinders. To achieve more accurate timing, the valve control strategies described herein may also be used to control the armature motion during the period that starts when the valve is commanded to open, and ends when the valve reaches the desired lift.

Figure 4A:
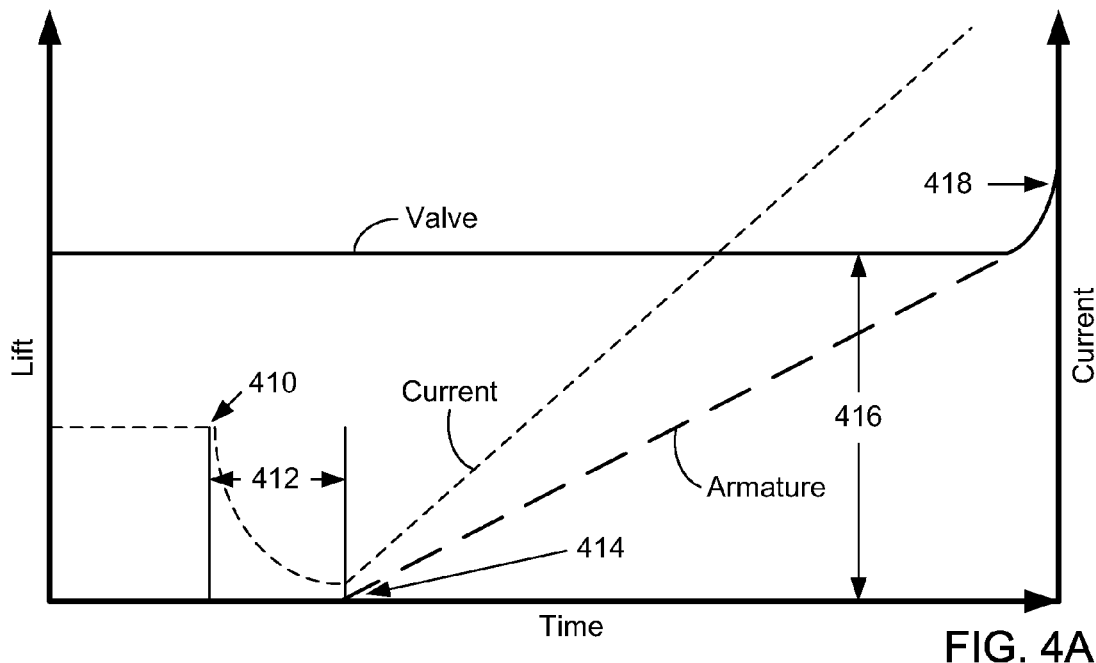
FIGS. 4A and 4B are graphs illustrating a delay between a valve command and physical movement of the valve armature.

For example, as illustrated by FIG. 4A, the position of the armature, the valve position, and the current applied to an electromagnetic coil of the actuator are compared for an example valve opening operation. The current supplied to the electric valve actuator is shown to be initially supplied to the coil at steady state until the valve is commanded to open at 410, wherein the current supplied to the coil is reduced. A delay indicated by 412 is shown where the current continues to decrease over time until the base holding current is reached as indicated at 414. When the base holding current is reached at 414, the armature begins to move with reference to the coil. Meanwhile, the position of the valve is shown at constant position with valve lash represented by 416. As the armature traverses the valve lash and reaches the valve, the position of the valve may likewise begin to change until it reaches 418, where the valve reaches an open position. Thus, as shown in FIG. 4A, the amount of excess current supplied to the electric valve actuator may effect the delay between when the valve is commanded to open (e.g. current is reduced) and when the armature begins moving (e.g. the base level of current has been reached).

Figure 4B:
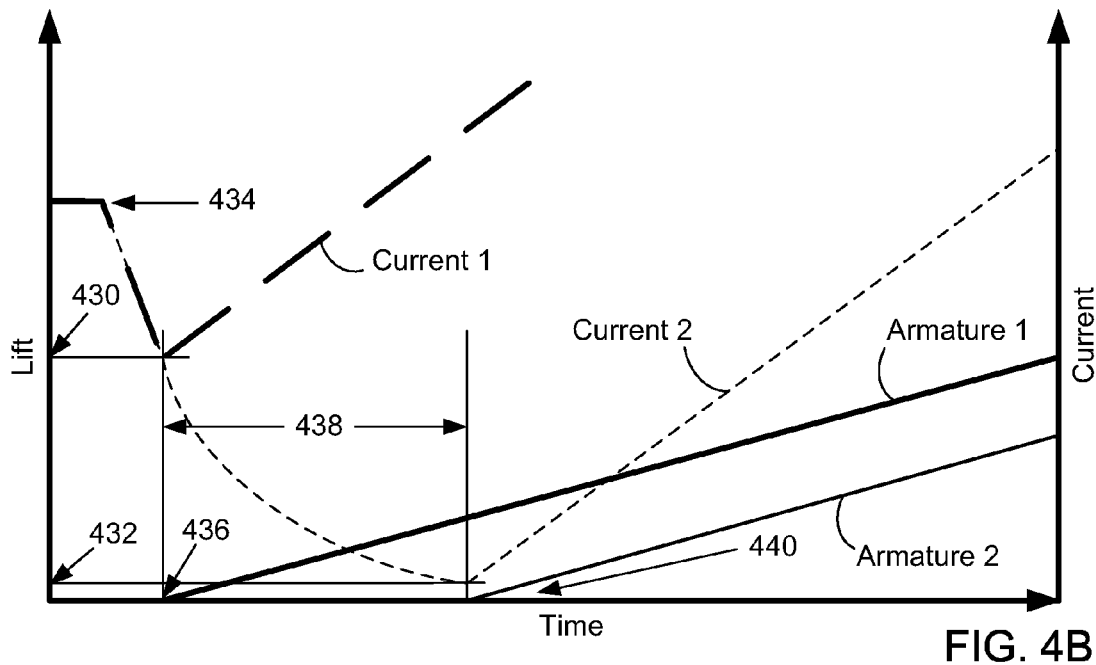

Further, with some valve control strategies that apply a common or fixed holding current to some or all of the electric valve actuators of the engine, there may be significant variance in the overhead current applied to the actuator (i.e. the difference between the commanded holding current and the base holding current for an individual valve). This overhead current may introduce variance between valves as a delay between the valve opening commands and the actual valve motion of the valves, as shown in FIG. 4B. As one prophetic example, more than 1 ms difference between a first valve having a 2A base holding current and a second valve having a 4A base holding current may occur when each of the valves are operated at a common 4.5A holding current. For relative measure, some engine requirements may include a maximum delay for event control of 0.028 ms (e.g. 1 deg crank angle) at a speed of 6000 rpm, which is significantly less than the 1 ms variance that a common holding current may cause.

FIG. 4B shows an example of a first and a second valve having different base holding currents, wherein a first applied current and a first corresponding armature position of the first valve is compared to a second applied current and a second corresponding armature position of the second valve. In this particular example, the second valve has a higher base holding current than the first valve. At 434, both the first and the second valves are commanded to open by reducing the level of current provided to a coil of each valve actuator. In this case, both current 1 and current 2 correspond to the current supplied to actuators 1 and 2, respectively, are shown to begin decreasing at 434. However, the base holding current for the second valve is reached at 430 before the base holding current for the first valve is reached at 432. Thus, a delay variance between the two valves is shown at 438, wherein the second armature begins moving at 436 before the first armature begins moving at 440.

Thus, it may be desirable under some conditions to operate each actuator coil at a holding current closer to the base holding current for the particular actuator. In this way, the holding power consumption, which is proportional to the square of holding current, may be reduced. Further, the delay for each actuator between a valve control command (e.g. reducing current supplied to a coil) and motion of the valve (e.g. opening the valve) may be reduced and/or the delay variance between two or more valves may be reduced.

As a second approach, which may be used in addition to or as an alternative to the first approach illustrated by FIG. 3, a base holding current for an electromagnetic coil of an electric valve actuator may be identified during operation of the engine and/or cylinder thereof by observing the current supplied to the coil at the end of a soft landing phase. In some embodiments, to achieve a soft landing of a valve, a substantially constant velocity profile (e.g. a linear position ramp) may be provided. Therefore, during the soft landing, the phase may be controlled to include zero or near zero acceleration, whereby the spring force and magnetic force applied by the coil are substantially balanced.

In some conditions, a current ($i\_a$) applied to the coil at a small air gap ($x\_a$) before a soft landing may be sufficient to overcome the spring force at the pole face during a subsequent holding operation, since as the air gap changes from $x\_a$ to zero, the spring force increases slower than does the magnetic force over the air gap. Further, using $i\_a$ as the holding current $i\_h$ may in some cases be overly conservative for at least some conditions, so a transfer function between the $i\_h$ and $i\_a$ may be applied to achieve robust operation of the valve actuator. Further still, to increase the robustness of the system, a position feedback strategy can be implemented where armature lift-off may be monitored and current applied to a coil may be increased if lift-off is detected. The use of active control of an individual armature may be used to improve the accuracy of the holding current observed by the application of at least one of the first approach where the base level of current is detected at start-up or during deactivation of the cylinder, and the second approach, where the base level of current is detected during operation of the cylinder coupled to the valve actuator for which the base level of holding current is to be identified.

Figure 5:
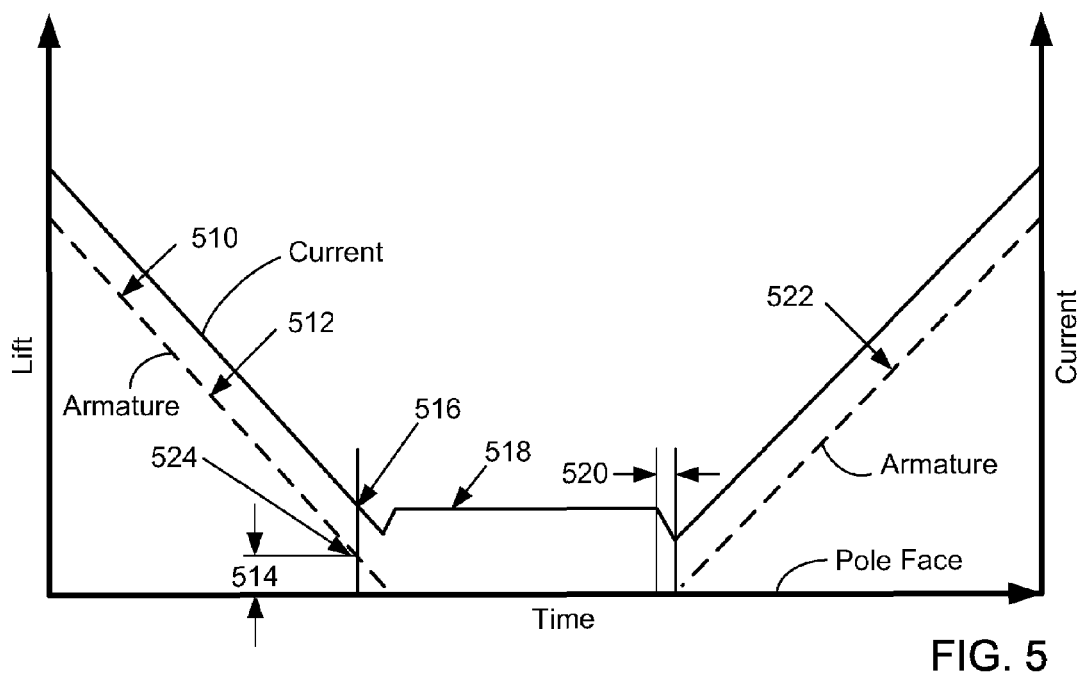
FIG. 5 is a graph illustrating an approach for identifying a base holding current for the valve actuator during operation of the valve.

FIG. 5 illustrates an example comparison between armature position and applied current during a soft landing operation. Label 510 indicates the position of the armature during the landing ramp while 522 indicates the position of the armature during the releasing ramp. Further, as indicated by 512, a substantially constant velocity may be achieved by balancing the spring and magnetic forces during the landing ramp and releasing ramp (e.g. by varying current supplied to a coil in response to armature position). The air gap $x\_a$ is indicated by 514, the slope of the landing ramp $v\_a$ is indicated by 524, the current supplied to the coil $i\_a$ at the air gap $x\_a$ is indicated by 516, the target holding current $i\_h$ is indicated by 518, and the target delay time $t\_d$ is indicated by 520.

During the soft landing, the current supplied to the coil is varied in response to the position of the armature (510) and/or valve. When a predetermined air gap is attained at 514, the current supplied to the coil at 516 may be stored in memory of the control system. After the soft landing operation is complete, the target holding current supplied to the coil at 518 may be identified based on the current supplied to the coil at 516. For example, the target holding current at 518 may be adjusted to be equal to, greater than or less than the current identified at 516 by some factor to ensure robust operation. Further, the level of current adjustment between the current identified at 516 and the target holding current at 518 may be varied based on a target delay of a subsequent valve opening operation at 520. If, for example, the target delay at 520 is to be reduced, then the target holding current at 518 may be reduced until the desired delay is achieved.

Figure 6:
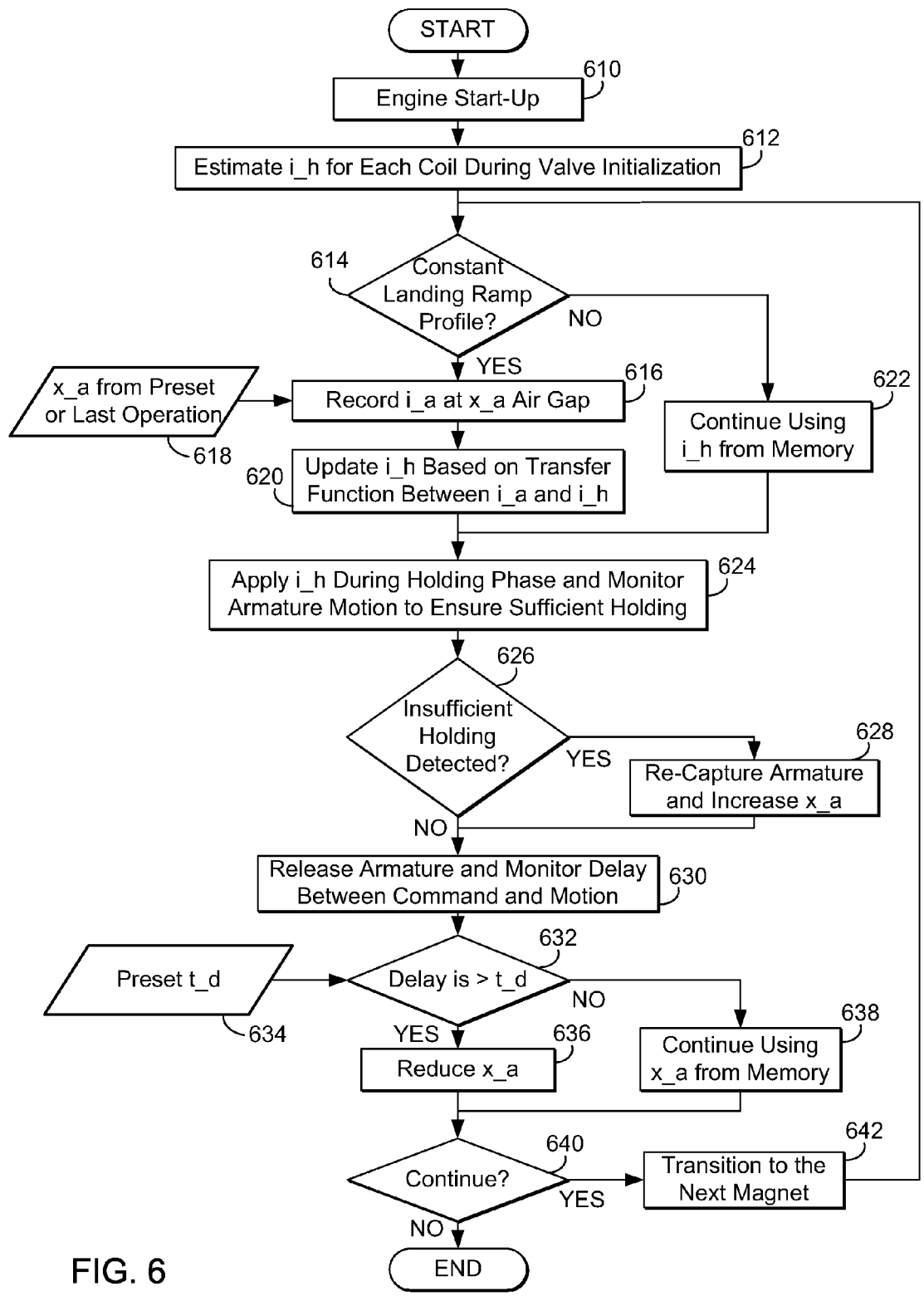
FIG. 6 is a flowchart illustrating an example routine for reducing holding current supplied to one or more electric valve actuators of an engine while maintaining at least a base holding current.

FIG. 6 illustrates an example routine that may be performed to identify a base holding current for a coil of the actuator and select a target holding current based on the identified base holding current. In response to a requested start-up of the engine or particular cylinder of the engine at 610, a target holding current $i\_h$ may be identified at 612 for each coil during a valve initialization operation. For example, the first approach described above may be employed such that a current larger than the base holding current may be applied to one of the upper and lower coils where it may be reduced over time until movement of the armature is detected. The target holding current may then selected for the particular coil based on the identified base holding current. For example, the target holding current may be equal to or greater than the base holding current, and may include some additional current for maintaining sufficient control during valve operation. The operation at 612 may be applied to a single coil of a single valve actuator, all coils of a single valve actuator, some or all of the coils of some or all of the actuators of a particular cylinder, or some or all of the coils of some or all of the actuators of the engine. Note that the operation at 612 may be performed during a deactivation operation of the engine or where only some of the cylinders are deactivated while other cylinders continue combusting. As one example, the operation at 612 may be performed before or during start-up of the engine, and may be again performed for each of the actuators of a cylinder that is later deactivated. In this manner, the base holding current may be updated with changes in the operating conditions of the actuators, such as temperature, pressure, valve wear, etc.

At 614, it may be judged whether a constant landing ramp profile (e.g. soft landing operation) is being used for the particular actuator. If the answer is yes, the routine may read air gap $x\_a$ from a preset or last soft landing operation at 618 and record $i\_a$ (the applied current) at air gap $x\_a$. Next, the target holding current $i\_h$ may be updated based on a transfer function between $i\_a$ and the previously identified $i\_h$. At 624, the updated $i\_h$ may be applied to a coil during a holding phase where motion of the armature may be monitored to ensure sufficient holding. Alternatively, if the answer at 614 is no, the routine may continue using $i\_h$ from memory at 622 before proceeding to 624.

At 626 it may be judged whether insufficient holding is detected, which may include motion detected at the armature and/or valve. If the answer at 626 is yes, the armature may be re-captured at 628 by increasing the target holding current $i\_h$ and increasing the air gap $x\_a$ where the current $i\_a$ is identified during a subsequent soft landing operation. Alternatively, if the answer at 626 is no, the armature may be released at the desired valve timing and the delay between the release command and motion of the armature and/or valve may be monitored at 630.

At 632, it may be judged whether the measured delay is greater than the target delay $t\_d$, where $t\_d$ may be read from a preset at 634. If the answer is yes, $x\_a$ may be reduced at 636. Alternatively, if the answer at 632 is no, $x\_a$ may be used from memory at 638.

At 640, it may be judged whether to continue the routine. If the answer is yes, the routine may transition to the next coil at 642 and return to 614. In this manner, a unique holding current may be identified for each of the coils of each of the electric valve actuators of the engine. Alternatively, if the answer at 640 is judged no, the routine may end.

In this manner, by identifying a base holding current for each coil of a particular cylinder during one or both of a non-firing and/or firing condition of the cylinder, a corresponding target holding current specific to each coil may be identified, thereby reducing error in valve response while reducing power consumption of the valve actuation system.

Figure 7:
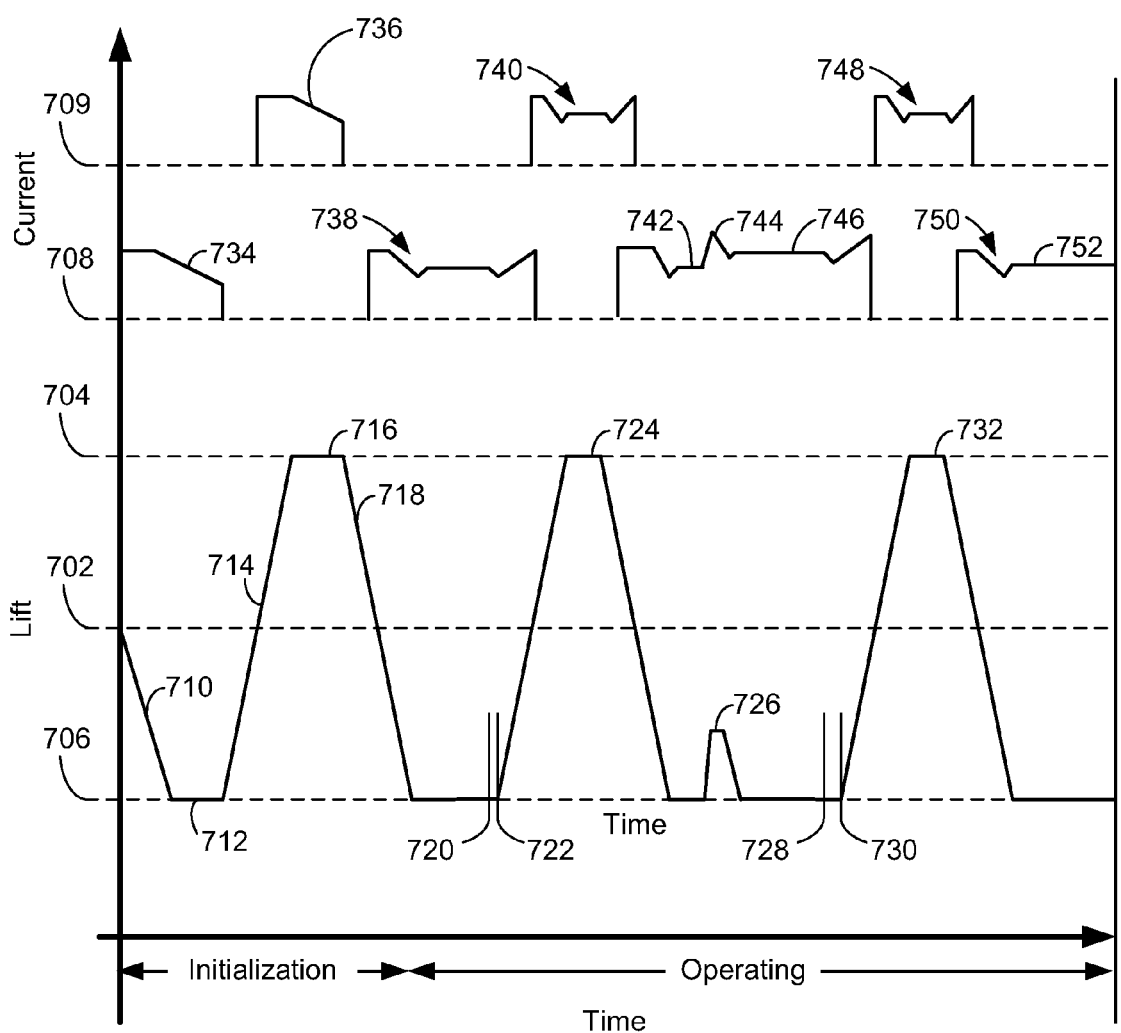
FIG. 7 is a graph illustrating an example valve control strategy employing the approaches of at least FIGS. 3, 4 and 5.

FIG. 7 illustrates how the valve control operation described above may be used together during engine operation to provide a sufficient holding current that is also near the base holding current. In particular, the graph of FIG. 7 provides a comparison between the position of the armature and the current applied at the top coil and the bottom coil of an electric valve actuator. The intermediate or default position of the armature when the actuator is not energized is identified at 702. The position of the armature at 706 corresponds to a closed valve position whereas the position of the armature at 704 corresponds to a fully open valve position. The level of current provided to the first coil is compared to the non-energized reference 708 and the level of current provided to the second coil is compared to the non-energized reference 709. In this manner, a current applied to the first coil that is greater than 708 causes a force to be applied to the armature in the direction of 706, whereas a current applied to the second coil that is greater than 709 causes a force to be applied to the armature in the direction of 704.

During an initialization period of the valve (e.g. before or during start-up or other non-firing condition) the base holding current may be identified as described above with reference to FIG. 3. For example, the armature may be drawn toward the first coil as indicated at 710 where it is held at the position of 712 while the current applied to the coil is reduced over time as indicated by 734. When the base holding current is reached, the armature may be released as indicated by 714 where it may be caught by the opposite coil at 716. The base holding current at the time of release of the first coil may be stored by the control system.

Next, the base holding current of the second coil may be identified. The armature may be held at 716, while the current applied to the second coil is reduced over time, as indicated at 736. When the base holding current for the second coil is attained, the armature may be released where it moves toward the intermediate position 702 as indicated by 718. The time of release and/or the base holding current at the time of release may be stored by the control system. Next, the armature may be again caught by the first coil by applying a target holding current greater than the base holding current stored by the control system as previously identified for the first coil as indicated by 738. As described above, the target holding current may be equal to or greater than the identified base holding current.

After the initialization of each coil of the valve actuator, the valve may be ready for operation. The profile of the current applied at 738 can be controlled to provide for a soft landing operation as described above with reference to FIG. 5. At a latter time, such as during operation of the engine, the armature may be released from the first coil by reducing the current at 720 causing the valve to open at 722. As described above with reference to FIGS. 4A and 4B, the delay between the current attaining the base holding current at 720 and movement of the armature and/or valve at 722 can be caused by duration of the current decay, which in turn may be caused by the magnitude of the difference between the base holding current and the applied target holding current.

The armature release from the first coil may move toward 704 where it may be held as indicated at 724 to the second coil by an applied current of 740. Note that the profile of the current applied at 740 may be controlled to provide the soft landing operation or may alternatively provide a soft landing. Again, the armature may be release by the second coil where it may be held at 706 by a target holding current indicated by 742. In this example, the target holding current at 742 may be the same as the target holding current at 738, which was identified during initialization. Alternatively, the target holding current at 742 may be updated (e.g. increased or decreased) by detecting a level of current applied to the actuator when the armature is at a small distance from the coil during a soft landing operation, as described above with reference to FIG. 5.

However, during operation of the engine, the operating conditions of the valve may change, potentially causing the target holding current to reach the base holding current. At this time, the armature may escape from the first coil as indicated by 726, thereby causing the valve to begin closing. In response to a detected movement of the armature by the control system, the current applied to the first coil may increase as indicated at 744 to recapture the armature wherein a higher target holding current than at 742 may be applied as indicated at 746.

Next, the valve may be opened by reducing the applied current to the base holding current at 728, whereby the armature begins moving away from the first coil as indicated by 730. However, since the target holding current was increased at 746, the delay between 728 and 730 may have increased as compared to 720 and 722. The control system may identify the delay and cause the subsequently applied target holding current to be reduced from 746. Meanwhile, a current 748 may be applied at the second coil to hold the armature at the open position as indicated at 732. The armature may be released from the second coil, where it is captured by the first coil by an applied current 750 including a soft landing profile, thereby closing the valve. The target holding current 752 may be updated by the control system so that it is less than the holding current applied at 746, which resulted in a longer than desired delay, and is greater than the holding current applied at 742, which resulted in an escape of the armature from the first coil.

In this way, a target holding current that provides sufficient holding force to maintain the desired valve position, while also maintaining a suitable delay in valve response may be achieved. As described herein, the target holding current may be determined from a base holding current that may be identified using one or more of the following approaches. During a valve initialization operation, such as before a combustion operation of the respective cylinder or during start-up of the cylinder, the base holding current may be separately identified for each coil of the actuator by holding the armature at a position away from equilibrium while the applied current is reduced over time until the armature moves. Further, where combustion in a cylinder of the engine is discontinued for one or more cycles in what may be referred to as a variable displacement engine, the base holding current may be updated using a similar strategy as was employed during the valve initialization operation. In this manner, changes in operating conditions of the valves may be accounted for, thereby enabling further reduction of the energy consumed by the actuators while maintaining suitable performance of the valve. During operation of the cylinder, the base holding current may be identified by a delay between the time when the current is reduced (e.g. the release command) to the time that the armature is released from the coil. Conversely, the delay between the commanded release and the physical release of the armature may be controlled by increasing or decreasing the target holding current relative to the base holding current. Further, the target holding current may be determined by detecting the level of current applied to the coil when the actuator is at a small distance from the coil during a soft landing operation. With regards to either of the above approaches, corrective action may be taken if the target current inadvertently reaches the base holding current, resulting in an undesired release of the armature, by increasing the target current.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method of operating an engine having at least one cylinder, said cylinder including at least one electric valve actuator, said actuator including at least a coil and an armature moveable thereto, the method comprising:
   during a non-firing state of the cylinder:
      holding the armature of the actuator at a first position away from an equilibrium position by supplying a first amount of current to a first coil of the actuator; and
      reducing current supplied to the first coil from said first amount to a lower second amount to cause the armature to begin moving toward the equilibrium position; and
   during a subsequent firing state of the cylinder,
      varying an amount of holding current supplied to the first coil for holding the armature away from the equilibrium position based on at least said second amount of current.

2. The method of claim 1, wherein said first position includes a position where the armature is resting against said first coil.

3. The method of claim 1, further comprising, identifying said second amount of current when said armature begins moving toward the equilibrium position, and storing a value corresponding to said second amount in memory.

4. The method of claim 1, wherein said reducing current supplied to the first coil includes reducing the amount of current supplied to the first coil over a predefined time period.

5. The method of claim 4, wherein the current is reduced at a predefined rate during said time period.

6. The method of claim 1, wherein the holding current supplied to the first coil is varied to be greater than said second amount of current.

7. The method of claim 6, wherein the holding current supplied to the first coil is further varied based on said first amount of current and is varied to be less than said first amount of current.

8. The method of claim 1, further comprising:
   during a non-firing state of the cylinder:
      holding the armature of the actuator at a second position away from the equilibrium position and on an opposite side of the equilibrium position from said first position by supplying a third amount of current to a second coil of the actuator;
      reducing current supplied to the second coil from said third amount to a lower fourth amount where the armature begins moving toward the equilibrium position; and
   during a subsequent firing state of the cylinder,
      varying an amount of holding current supplied to the second coil based on the fourth amount of current.

9. The method of claim 8, wherein the amount of holding current supplied to the second coil is greater than said fourth amount of current and less than said third amount of current.

10. The method of claim 8, wherein the amount of holding current supplied to the second coil is different than the amount of holding current supplied to the first coil.

11. A method of operating an engine including at least a cylinder, said cylinder including at least a valve controlled by a valve actuator, the method comprising:
   after shut-off of the engine and before a first combustion event:
   supplying a first amount of electrical current to the valve actuator sufficient to hold the valve at a closed position;
   reducing said first amount of current to a second amount of current at which said valve begins moving away from said closed position; and
   holding said valve at said closed position during at least one subsequent combustion event in the cylinder by supplying a holding current to the valve actuator, wherein the holding current is controlled to be less than said first amount and greater than said second amount of current.

12. The method of claim 11, further comprising, after said at least one combustion event in the cylinder:
   discontinuing combustion in the cylinder for at least one cycle while at least a second cylinder of the engine continues combusting;
   during said discontinued combustion:
   supplying a third amount of current to the valve actuator sufficient to hold the valve at a closed position;
   reducing said third amount of current to a fourth amount of current at which said valve begins moving away from said closed position;
   holding said valve at said closed position during at least one combustion event in the cylinder after combustion was discontinued by supplying the holding current to the valve actuator; wherein said holding current is adjusted based on a comparison of said second amount and said fourth amount.

13. The method of claim 12, wherein said holding current is increased when said fourth amount of current is greater than said second amount.

14. The method of claim 12, wherein said holding current is decreased when said fourth amount of current is less than said second amount.

* * * * *